US012723647B2

(12) United States Patent
Juday et al.

(10) Patent No.: US 12,723,647 B2
(45) Date of Patent: Sep. 1, 2026

(54) ACTIVE OIL FLOW CONTROL IN ELECTRIC DRIVE UNIT

(71) Applicant: GM Global Technology Operations LLC, Detroit, MI (US)

(72) Inventors: Zachary Juday, West Bloomfield, MI (US); Steven P. Moorman, Pinckney, MI (US); James M. Hart, Belleville, MI (US); Mark R. Claywell, Birmingham, MI (US); Chad Michael Huls, Grand Rapids, MI (US); Christopher M. Kaminski, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 241 days.

(21) Appl. No.: 18/766,077

(22) Filed: Jul. 8, 2024

(65) Prior Publication Data

US 2026/0009464 A1 Jan. 8, 2026

(51) Int. Cl.

*F16H 57/00* (2012.01)
*F16H 57/04* (2010.01)
*H02K 9/193* (2006.01)

(52) U.S. Cl.

CPC ......... *F16H 57/0476* (2013.01); *H02K 9/193* (2013.01)

(58) Field of Classification Search

CPC .......... H02K 9/19; H02K 9/197; H02K 9/193; F16H 57/0476

See application file for complete search history.

(56) References Cited

U.S. PATENT DOCUMENTS 5,217,085 A * 6/1993 Barrie ...................... F01M 1/16 184/6.12
8,928,195 B2 * 1/2015 Ohashi ..................... H02K 9/19 310/58
2020/0361448 A1 * 11/2020 Moorman ............... F16H 61/12
2022/0055599 A1 * 2/2022 Moorman ............. B60T 13/146
2022/0112848 A1 * 4/2022 Hrusch ..................... F16D 3/10
2025/0332885 A1 * 10/2025 Claywell ................ B60H 1/143

FOREIGN PATENT DOCUMENTS

CN 116021980 A * 4/2023 ......... F16H 57/0476
DE 102016211226 B3 6/2017
DE 102021124993 A1 3/2023
DE 112021008056 T5 7/2024

OTHER PUBLICATIONS

Ersoy, et al., Chassis Manual. 5th edition. Wiesbaden: Springer, 2017 . p. 936-940. ISBN 978-3-658-15468-4. https://doi.org/10.1007/978-3-658-15468-4_18 [accessed on Feb. 28, 2025].

* cited by examiner

*Primary Examiner* — Zakaria Elahmadi

(74) *Attorney, Agent, or Firm* — Vivacqua Crane, PLLC

(57) ABSTRACT

An electric drive unit includes an electric motor including a rotor and a stator, the rotor operationally connected to a gear set, an oil delivery system adapted to supply pressurized oil to a plurality of discreet oil flow circuits within the electric motor, and an oil flow control module positioned between the electric motor and the oil delivery system and adapted to provide independent active control of oil flow within at least two of the plurality of oil flow circuits within the electric motor.

20 Claims, 8 Drawing Sheets

62B2
54B
80
64
58
80
48
52
50
80
20
56
80
64
54A
62B1
54

62C
62B
62A
68
82
70
60
72A
74B
74A
94
100
92
76B
76A
98
108
96
160
158
156
162
136

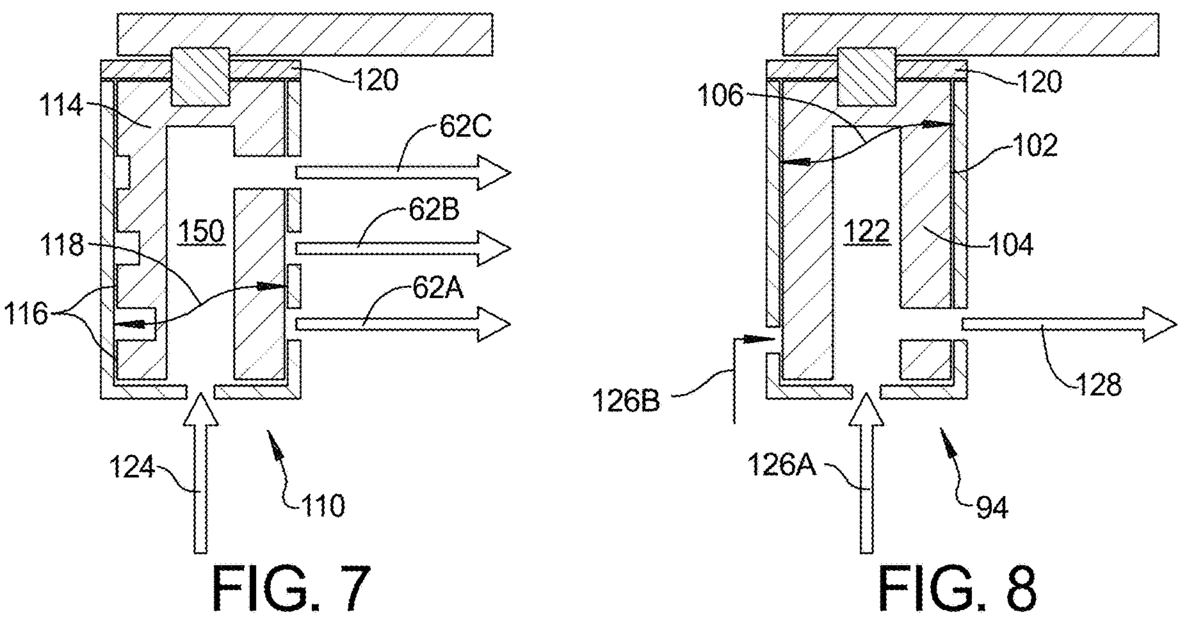
FIG. 7
FIG. 8
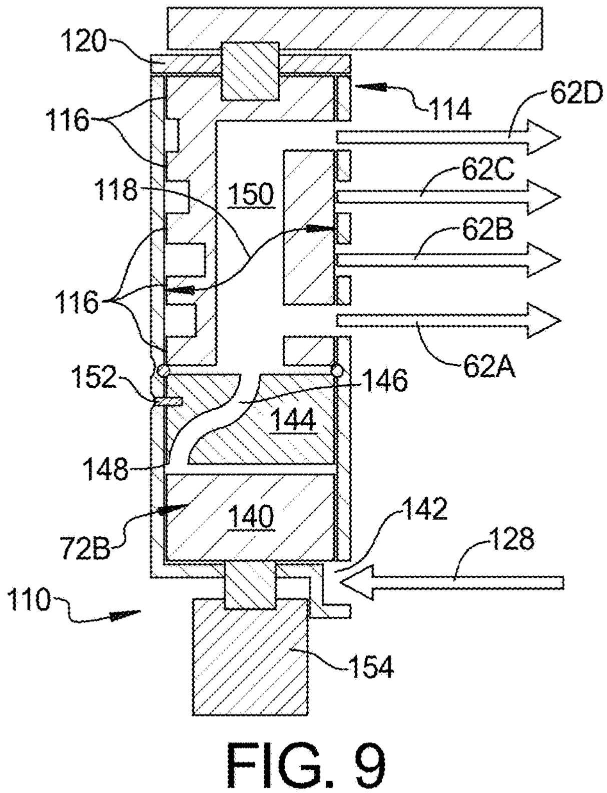
FIG. 9

ACTIVE OIL FLOW CONTROL IN ELECTRIC DRIVE UNIT

INTRODUCTION

The present invention relates generally to oil flow control to discreet lubrication circuits within an electric drive unit. Specifically, current electric drive units use passive methods, such as oil pump control and orifices positioned within individual oil passages to control oil flow to discreet sub-circuits (gearbox, rotor, stator, bus bar) within the electric drive unit.

Thus, while current systems and methods achieve their intended purpose, there is a need for a new and improved system and method for providing active oil flow control to a plurality of discreet oil flow circuits within an electric drive unit.

SUMMARY

According to several aspects of the present disclosure, an electric an electric drive unit includes an electric motor including a rotor and a stator, the rotor operationally connected to a gear set, an oil delivery system adapted to supply pressurized oil to a plurality of discreet oil flow circuits within the electric motor, and an oil flow control module positioned between the electric motor and the oil delivery system and adapted to provide independent active control of oil flow within at least two of the plurality of oil flow circuits within the electric motor.

According to another aspect, the oil flow control module includes a plurality of linear spool valves, one of the plurality of linear spool valves associated with each one of the at least two of the plurality of oil flow circuits being controlled by the oil flow control module and adapted to provide independent active control of oil flow within the associated oil flow circuit.

According to another aspect, the oil flow control module includes a plurality of linear force solenoids, one of the plurality of linear force solenoids associated with each one of the plurality of linear spool valves and adapted to selectively actuate the associated spool valve.

According to another aspect, the plurality of oil flow circuits includes a first oil flow circuit adapted to provide oil flow to the gear set of the electric motor, a second oil flow circuit adapted to provide oil flow to the rotor of the electric motor, a third oil flow circuit adapted to provide oil flow to end turn spray baffles of the electric motor; and a fourth oil flow circuit adapted to provide oil flow to the stator of the electric motor, the plurality of linear spool valves of the oil flow control module including a first linear spool valve and the plurality of linear force solenoids of the oil flow control module including a first linear force solenoid, the first linear force solenoid adapted to selectively actuate the first linear spool valve and the first linear spool valve adapted to selectively control a flow of oil within the first oil flow circuit and actively control oil flow to the gear set of the electric motor, and the plurality of linear spool valves of the oil flow control module further including a second linear spool valve and the plurality of linear force solenoids of the oil flow control module further including a second linear force solenoid, the second linear force solenoid adapted to selectively actuate the second linear spool valve and the second linear spool valve adapted to selectively control a flow of oil within the second oil flow circuit and actively control oil flow to the rotor of the electric motor.

According to another aspect, the electric motor includes a fifth oil flow circuit adapted to provide oil flow to an air gap between the stator and the rotor within the electric motor, the plurality of linear spool valves of the oil flow control module further including a third linear spool valve and the plurality of linear force solenoids of the oil flow control module further including a third linear force solenoid, the third linear force solenoid adapted to selectively actuate the third linear spool valve and the third linear spool valve adapted to selectively control a flow of oil within the fifth oil flow circuit and actively control oil flow to the air gap between the stator and the rotor within the electric motor.

According to another aspect, the gear set of the electric motor comprises a first gear set operationally engaged with a first end of the rotor and a second gear set operationally engaged with a second end of the rotor, and wherein, the first oil flow circuit is adapted to provide oil flow to each of the first and second gear sets, and the second oil flow circuit includes a first spur adapted to provide oil flow for magnet cooling and a second spur adapted to provide oil flow for differential lubrication.

According to another aspect, the oil delivery system includes a main sump, an oil pump adapted to pull oil from the main sump and supply pressurized oil to the oil flow control module, and a heat exchanger positioned between the oil pump and the oil flow control module, the oil flow control module including a temperature control rotary spool valve adapted to selectively route oil flow from the oil delivery system to the at least two of the plurality of oil flow circuits within the electric motor that are controlled by the oil flow module prior to the oil passing through the heat exchanger, and route oil flow from the oil delivery system to the at least two of the plurality of oil flow circuits within the electric motor that are controlled by the oil flow module after the oil passes through the heat exchanger, the temperature control rotary spool valve adapted to meter the ratio of oil that does not pass through the heat exchanger to the oil that passes through the heat exchanger to control a temperature of the oil routed to the at least two of the plurality of oil flow circuits within the electric motor that are controlled by the oil flow module.

According to another aspect, the plurality of oil flow circuits includes a first oil flow circuit adapted to provide oil flow to the gear set of the electric motor, a second oil flow circuit adapted to provide oil flow to the rotor of the electric motor, and a third oil flow circuit adapted to provide oil flow to end turn spray baffles of the electric motor, and the oil flow control module including a flow control rotary spool valve adapted to selectively and independently control a flow of oil within the first oil flow circuit, the second oil flow circuit and the third oil flow circuit.

According to another aspect, the oil delivery system includes a main sump, an oil pump adapted to pull oil from the main sump and supply pressurized oil to the oil flow control module, and a heat exchanger positioned between the oil pump and the oil flow control module, the oil flow control module including a temperature control rotary spool valve adapted to selectively route oil flow from the oil delivery system to the at least two of the plurality of oil flow circuits within the electric motor that are controlled by the oil flow module prior to the oil passing through the heat exchanger, and route oil flow from the oil delivery system to the at least two of the plurality of oil flow circuits within the electric motor that are controlled by the oil flow module after the oil passes through the heat exchanger, the temperature control rotary spool valve adapted to meter the ratio of oil that does not pass through the heat exchanger to the oil that passes through the heat exchanger to control a temperature of the oil routed to the at least two of the plurality of oil flow circuits within the electric motor that are controlled by the oil flow module.

According to another aspect, the electric drive unit further includes a temperature control bypass circuit adapted to selectively allow oil flow from the oil delivery system to bypass the temperature control rotary spool valve, wherein, when the temperature control rotary spool valve is selectively actuated to allow only oil that has passed through the heat exchanger to flow through the temperature control rotary spool valve, the temperature control bypass circuit is adapted to allow oil that has passed through the heat exchanger to bypass the temperature control rotary spool valve.

According to another aspect, each of the temperature control rotary spool valve and the flow control rotary spool valve are positioned within a machined bore of a housing of the oil flow control module, sealed within the machined bore by a top plate and actuated by an actuator.

According to another aspect, the flow control rotary spool valve is positioned within a machined bore of a housing of the oil flow control module, sealed within the machined bore by a top plate and actuated by an actuator, and further wherein, a pump is positioned within the machined bore adjacent the flow control rotary spool valve, the pump adapted to pull oil from a main sump and feed pressurized oil to the flow control rotary spool valve.

According to another aspect, the pump comprises a gerotor rotationally supported within the machined bore within the oil flow control module, coaxial with the flow control rotary spool valve, the machined bore in communication with the main sump at a point adjacent to the gerotor, a port plate positioned within the machined bore between and coaxial with the gerotor and the flow control rotary spool valve, the port plate including a port adapted to channel oil flow from the gerotor at an outer periphery of the machined bore to a central oil passage within the flow control rotary spool valve, an anti-rotational key adapted to prevent rotational movement of the port plate and allow axial float of the port plate within the machined bore of the oil flow control module, and a motor adapted to rotate the gerotor within the machined bore, wherein, rotation of the gerotor pulls oil from the main sump and pushes pressurized oil through the port plate to the flow control rotary spool valve.

According to another aspect, the oil flow control module includes an integrated pressure side filter.

According to another aspect, the oil flow control module includes a filter bypass circuit adapted to selectively allow oil flow to bypass the pressure side filter.

According to another aspect, the oil flow control module is one of a modular component that is mounted onto a housing of the electric drive unit, wherein the oil flow control module may be removed and a different oil flow control module providing different flow control characteristics may be installed within the electric drive unit, and machined integrally within a housing of the electric drive unit.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 7 is a schematic side sectional view of the flow control rotary spool valve shown in FIG. 5;

FIG. 8 is a schematic side sectional view of the temperature control rotary spool valve shown in FIG. 5 wherein oil flow is directed to the flow control rotary spool valve;

FIG. 9 is a schematic side sectional view of the flow control rotary spool valve shown in FIG. 6;

Figure 1:
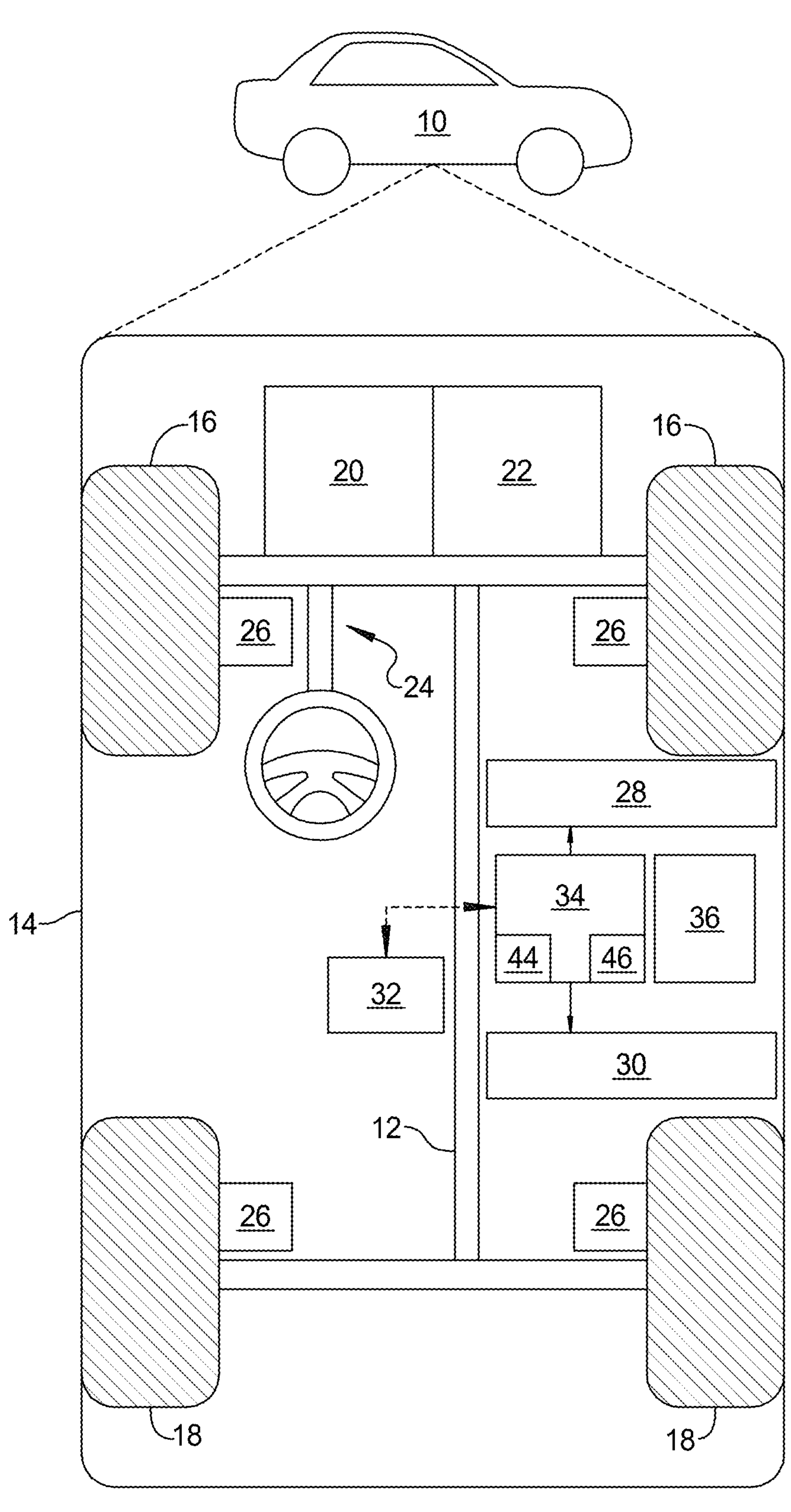
FIG. 1 is a schematic diagram of a vehicle according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated electric drive unit 20. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the electric drive unit 20 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes the electric drive unit 20, a transmission system 22, a steering system 24, a brake system 26, a sensor system 28, an actuator system 30, at least one data storage device 32, a vehicle controller 34, and a wireless communication module 36. The vehicle 10, being equipped with an electric drive unit 20 may be a hybrid electric vehicle, wherein the electric drive unit 20 supplements other forms of propulsion and wherein the hybrid vehicle includes some form of transmission system 22 configured to transmit power from the electric drive unit 20 and other forms of propulsion to the vehicle's front wheels 16 and rear wheels 18 according to selectable speed ratios. According to various embodiments, the transmission system 22 may include a step-ratio automatic transmission, a continuously-variable transmission, or other appropriate transmission. Alternatively, the vehicle 10 may be a purely electric vehicle, wherein there may be no transmission system 22. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, such as for a fully autonomous vehicle, the steering system 24 may not include a steering wheel.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
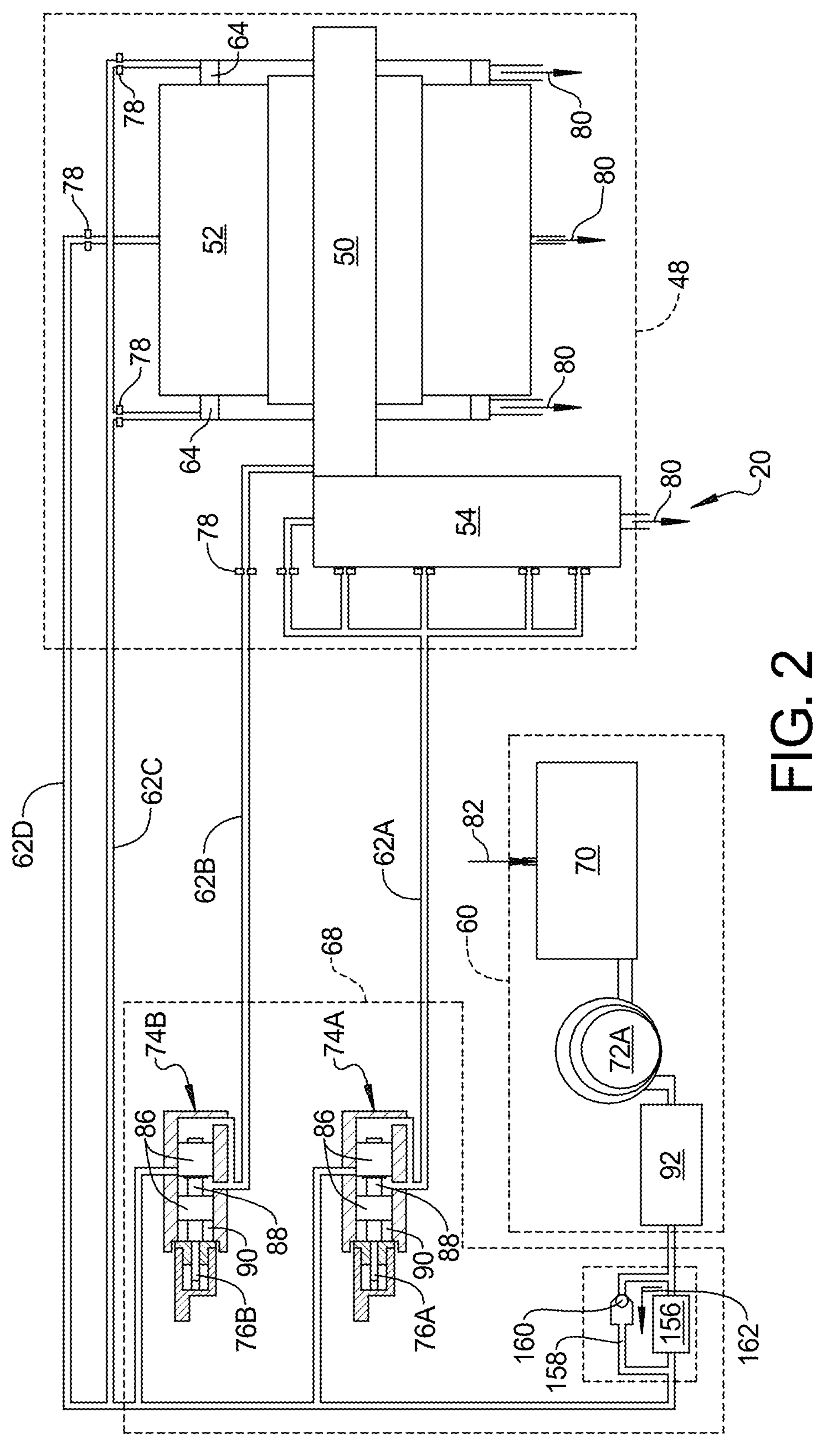
FIG. 2 is a schematic diagram of an electric drive unit according to an exemplary embodiment of the present disclosure wherein an oil flow control module includes two linear spool valves.

Referring to FIG. 2, in an exemplary embodiment the electric drive unit 20 includes an electric motor 48 which includes a rotor 50 and a stator 52. The rotor 50 of the electric motor 48 is operationally connected to a gear set 54 which translates power from the electric motor 48, via rotation of the rotor 50, through the gear set 54 either directly to a wheel or wheels 16, 18 of an electric or hybrid electric vehicle 10 or through a transmission 22 to one or more wheels 16, 18 of the electric or hybrid electric vehicle 10. As shown in FIG. 2, the rotor 50 of the electric motor 48 may be operationally connected to a single gear set 54. In another exemplary embodiment, referring to FIG. 3, the gear set 54 of the electric motor 48 comprises a first gear set 54A operationally engaged with a first end 56 of the rotor 50 and a second gear set 54B operationally engaged with a second end 58 of the rotor 50.

To facilitate lubrication and thermal management of the electric motor 48 and the gear set 54 an oil delivery system 60 is adapted to supply pressurized oil to a plurality of discreet oil flow circuits 62A, 62B, 62C, 62D, 62E within the electric motor 48. Referring to FIG. 2, in an exemplary embodiment, the plurality of oil flow circuits 62A, 62B, 62C, 62D, 62E includes a first oil flow circuit 62A adapted to provide oil flow to the gear set 54 of the electric motor 48, a second oil flow circuit 62B adapted to provide oil flow to the rotor 50 of the electric motor 48, a third oil flow circuit 62C adapted to provide oil flow to end turn spray baffles 64 of the electric motor 48, and a fourth oil flow circuit 62D adapted to provide oil flow to the stator 52 of the electric motor 48. The end turns are the portion of the stator windings that are exposed, as they extend axially beyond the stator core.

Figure 3:
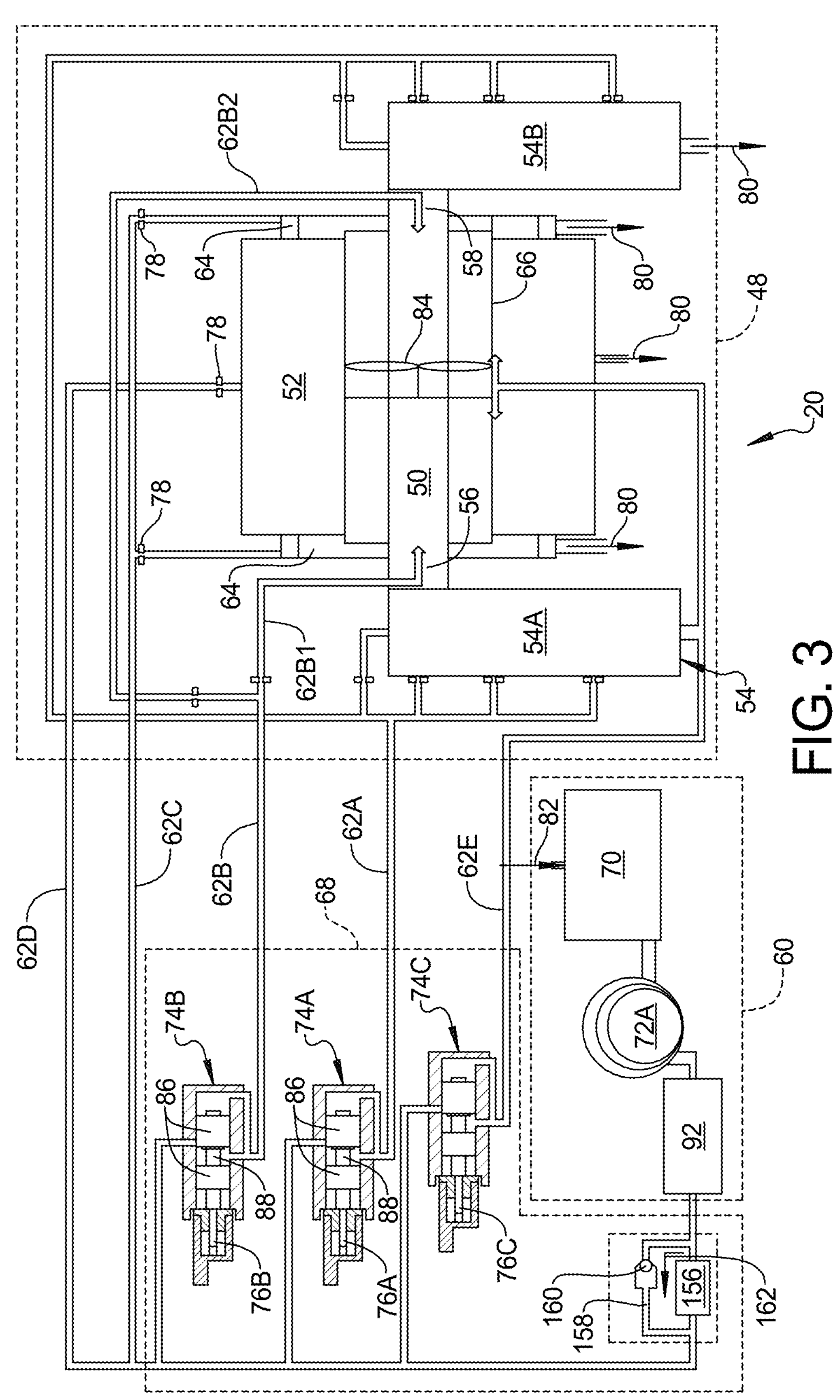
FIG. 3 is a schematic diagram of an electric drive unit according to an exemplary embodiment of the present disclosure wherein an oil flow control module includes three linear spool valves.

Referring again to FIG. 3, in another exemplary embodiment, the plurality of oil flow circuits 62A, 62B, 62C, 62D, 62E includes a fifth oil flow circuit 62E adapted to provide oil flow to an air gap 66 between the stator 52 and the rotor 50 within the electric motor 48. Further, as shown in FIG. 3, the first oil flow circuit 62A is adapted to provide oil flow to each of the first and second gear sets 54A, 54B, and the second oil flow circuit 62B includes a first spur 62B1 adapted to provide oil flow for magnet cooling and a second spur 62B2 adapted to provide oil flow for differential lubrication.

An oil flow control module 68 is positioned between the electric motor 48 and the oil delivery system 60. Oil is pulled from a main sump 70 and pressurized by a pump 72A, 72B that pushes or pulls the oil to the oil flow control module 68. The oil flow control module 68 is adapted to provide independent active control of oil flow within at least two of the plurality of oil flow circuits 62A, 62B, 62C, 62D, 62E within the electric motor 48. In an exemplary embodiment, the oil flow control module 68 includes a plurality of linear spool valves 74A, 74B, 74C, one of the plurality of linear spool valves 74A, 74B, 74C associated with each one of the at least two of the plurality of oil flow circuits 62A, 62B, 62C, 62D, 62E being controlled by the oil flow control module 68. Each of the plurality of linear spool valves 74A, 74B, 74C are adapted to provide independent active control of oil flow within the associated oil flow circuit. In an exemplary embodiment, the oil flow control module 68 further includes a plurality of linear force solenoids 76A, 76B, 76C. One of the plurality of linear force solenoids 76A, 76B, 76C is associated with each one of the plurality of linear spool valves 74A, 74B, 74C and is adapted to selectively actuate the associated linear spool valve.

Each of the plurality of linear force solenoids 76A, 76B, 76C is in communication with the vehicle controller 34, or alternatively, a separate controller dedicated to the electric drive unit 20. Based on information gathered by the controller 34 from various sensors within the electric drive unit 20 and sensors within the vehicle 10, the controller 34 selectively and individually actuates, using the plurality of linear force solenoids 76A, 76B, 76C, the plurality of linear spool valves 74A, 74B, 74C to control oil flow within the associated oil flow circuits to maintain proper thermal management and lubrication of the electric motor 48.

Referring again to FIG. 2, in an exemplary embodiment, the plurality of linear spool valves 74A, 74B, 74C of the oil flow control module 68 include a first linear spool valve 74A and the plurality of linear force solenoids 76A, 76B, 76C of the oil flow control module 68 includes a first linear force solenoid 76A. The first linear force solenoid 76A, via communication with the controller 34, is adapted to selectively actuate the first linear spool valve 74A and the first linear spool valve 74A is adapted to selectively control a flow of oil within the first oil flow circuit 62A and actively control oil flow to the gear set 54 of the electric motor 48. Further, the plurality of linear spool valves 74A, 74B, 74C of the oil flow control module 68 includes a second linear spool valve 74B and the plurality of linear force solenoids 76A, 76B, 76C of the oil flow control module 68 includes a second linear force solenoid 76B. The second linear force solenoid 76B, via communication with the controller 34, is adapted to selectively actuate the second linear spool valve 74B and the second linear spool valve 74B is adapted to selectively control a flow of oil within the second oil flow circuit 62B and actively control oil flow to the rotor 50 of the electric motor 48.

Oil flow control within the third and fourth oil flow circuits 62C, 62D is passively controlled by controlling the pressure at which the oil is pumped to the oil flow control module 68 and into the plurality of oil flow circuits 62A, 62B, 62C, 62D, 62E and by using restrictive orifices 78 within each of the plurality of oil flow circuits 62A, 62B, 62C, 62D, 62E. Restrictive orifices 78 limit a maximum oil flow therethrough, providing passive limitation of oil flow rates. Oil flowing through the plurality of oil flow circuits 62A, 62B, 62C, 62D, 62E leaves the electric motor 48 at various locations, as indicated by arrows 80, and is channeled (not shown) back to the main sump 70 of oil, as indicated by arrow 82.

Referring again to FIG. 3, in another exemplary embodiment the plurality of linear spool valves 74A, 74B, 74C of the oil flow control module 68 further includes a third linear spool valve 74C and the plurality of linear force solenoids 76A, 76B, 76C of the oil flow control module 68 further includes a third linear force solenoid 76C. The third linear force solenoid 76C is adapted to, via communication with the controller 34, selectively actuate the third linear spool valve 74C and the third linear spool valve 74C is adapted to selectively control a flow of oil within the fifth oil flow circuit 62E and actively control oil flow to the air gap 66 between the stator 52 and the rotor 50 within the electric motor 48. In another exemplary embodiment, as shown in FIG. 3, the rotor 50 includes an integrated impeller 84 that is adapted to draw air into the electric motor 48, providing additional thermal control for the electric motor 48.

Each linear spool valve 74A, 74B, 74C is a cylindrical unit that has large diameter lands 86, machined within a spool 88 to slide, linearly, in a close-fitting bore 90 of the oil flow control module 68. The lands 86 of the spool 88 divide the bore 90 into a series of separate chambers. The spool 88 within each linear spool valve 74A, 74B, 74C provide different oil flow paths by opening and closing of connected ports by the spool lands 86, as the spool lands 86 move relative to connected ports when the spool 88 moves linearly back and forth within the machined bore 90 of the oil flow control module 68. The ports of the oil flow control module 68 lead into these chambers and the position of the spool 88 determines the nature of interconnection between the ports (plurality of oil flow circuits 62A, 62B, 62C, 62D, 62E) and the oil being supplied to the oil flow control module 68. The plurality of linear force solenoids 76A, 76B, 76C are adapted to move the spools 88 within the associated linear spool valves 74A, 74B, 74C back and forth. Movement of the spool 88 within each of the plurality of linear spool valves 74A, 74B, 74C allows the oil flow to an associated one of the plurality of oil flow circuits 62A, 62B, 62C, 62D, 62E to be opened, partially opened, or closed. Slight adjustments to the linear position of the spool 88 within one of the plurality of linear spool valves 74A, 74B, 74C allows the flow of oil into an associated one of the oil flow circuits 62A, 62B, 62C, 62D, 62E to be finely tuned. For example, movement, via the first linear force solenoid 76A, of the spool 88 within the first linear spool valve 74A selectively opens, closes or partially opens a path for oil flow into the first oil flow circuit 62A. Slight adjustments to the linear position of the spool 88 within the first linear spool valve 74A allows the flow of oil to the gear set 54 of the electric motor 48 to be selectively increased, decreased or closed off depending on circumstances.

Figure 4:
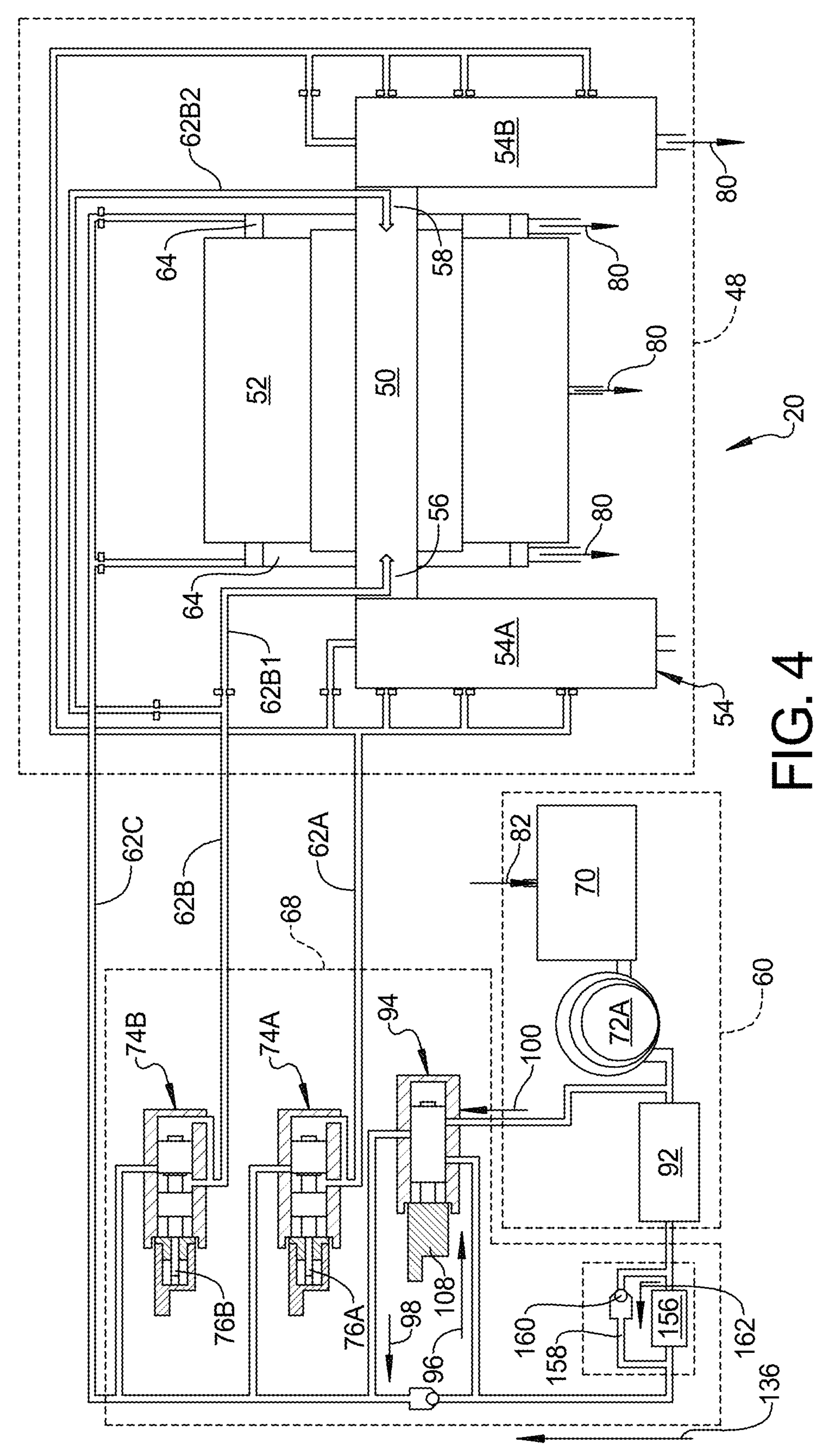
FIG. 4 is a schematic diagram of an electric drive unit according to an exemplary embodiment of the present disclosure wherein an oil flow control module includes two linear spool valves and a temperature control rotary spool valve.

In an exemplary embodiment, the oil delivery system 60 includes a heat exchanger 92 positioned between the main sump 70 and the oil flow control module 68. The heat exchanger 92 may be any suitable type of heat exchanger 92. In an exemplary embodiment the heat exchanger 92 is a stacked plate heat exchanger 92, wherein a temperature of the oil being pumped to the oil flow control module 68 can be controlled. Referring to FIG. 4, the oil flow control module 68 includes a temperature control rotary spool valve 94. Oil, after passing through the heat exchanger 92 is routed to the temperature control rotary spool valve 94, as indicated by arrows 96 and 100. The temperature control rotary spool valve 94 is adapted to receive oil from a point prior to the heat exchanger 92, such that the oil has not passed through the heat exchanger 92, as indicated by arrow 100. Further, the temperature control rotary spool valve 94 is adapted to receive oil that has passed through the heat exchanger, as indicated by arrow 96. Based on feedback from temperature sensors, estimated oil flow, and coolant circuit parameters (coolant temperature, coolant flow), the temperature control rotary spool valve 94 is adapted to control the ratio of oil that does not pass through the heat exchanger to the oil that does pass through the heat exchanger and ultimately is routed to the at least two of the plurality of oil flow circuits 62A, 62B, 62C, 62D, 62E within the electric motor 48 that are controlled by the oil flow module 68. Oil that is received by the temperature control rotary spool valve from before the heat exchanger is at an ambient temperature of the oil within the main sump 70. The temperature of the oil that passes through the heat exchanger is modified by the heat exchanger. By controlling the ratio of oil that is received directly from the main sump 70 to the oil that is received after passing through the heat exchanger, the temperature control rotary spool valve optimizes the temperature of the oil that is ultimately routed forward to the at least two of the plurality of oil flow circuits 62A, 62B, 62C, 62D, 62E within the electric motor 48 that are controlled by the oil flow module 68, as indicated by arrow 98.

Rotary Spool valves operate based on rotational movement of the spool. The temperature control rotary spool valve 94 is a cylindrical unit that has large diameter lands 102 machined within a spool 104 to rotate within a close-fitting bore 106 of the oil flow control module 68. The lands 102 of the spool 104 divide the bore 106 into a series of separate chambers. The spool 104 within the temperature control rotary spool valve 94 provides different oil flow paths by opening and closing of connected ports by the spool lands 102, as the spool lands 102 move relative to connected ports when the spool 104 rotates within the machined bore 106 of the oil flow control module 68. The ports of the oil flow control module 68 lead into these chambers and the position of the spool 104 determines the nature of interconnection between the ports. The temperature control rotary spool valve 94 is actuated by a solenoid or motor 108 adapted to rotate the spool 104 within the bore 106 of the temperature control rotary spool valve 94. Movement of the spool 104 within the temperature control rotary spool valve 94 allows the temperature control rotary spool valve 94 to selectively control the ratio of oil that is received directly from the main sump 70 to the oil that is received after passing through the heat exchanger 92.

Figure 5:
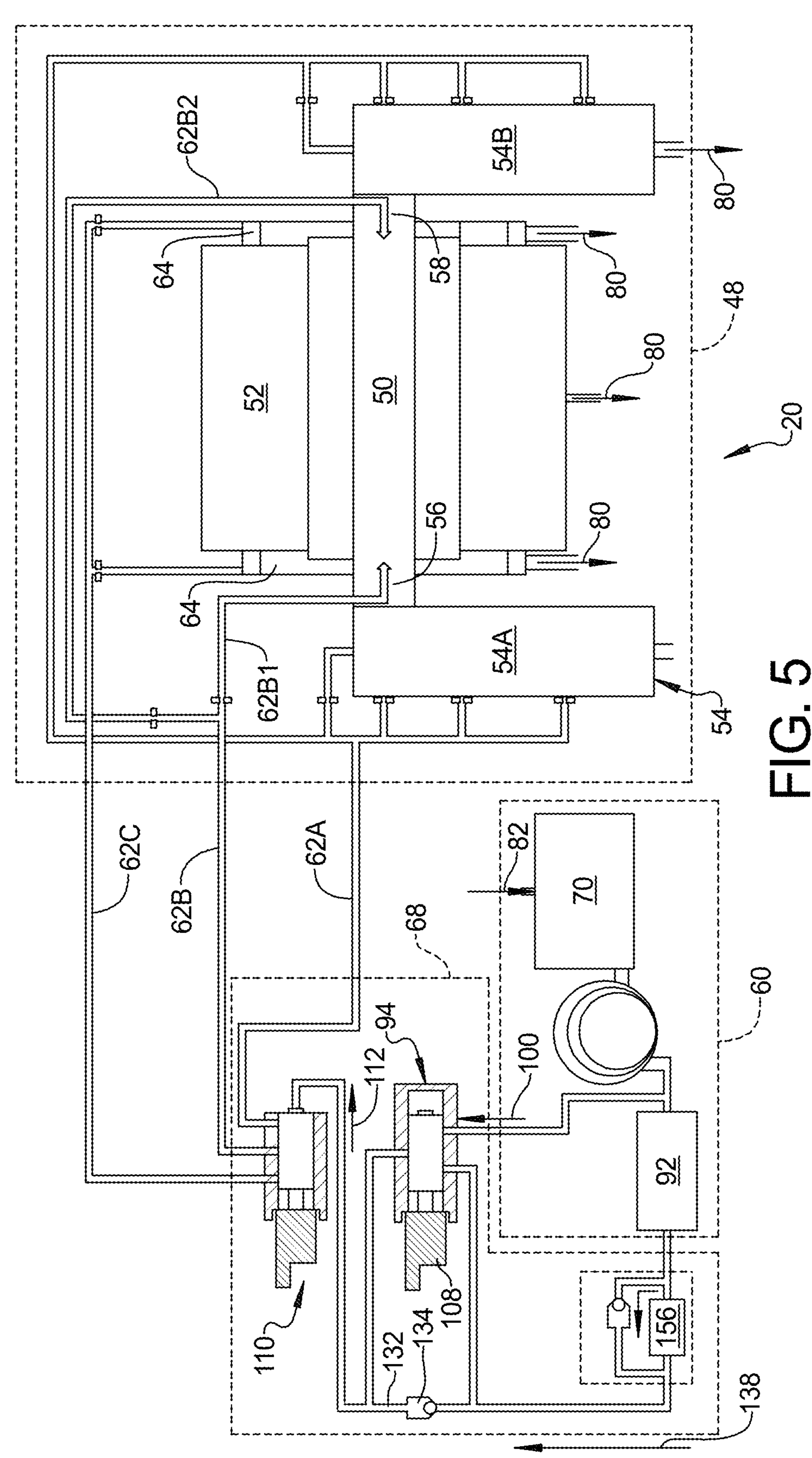
FIG. 5 is a schematic diagram of an electric drive unit according to an exemplary embodiment of the present disclosure wherein an oil flow control module includes a temperature control rotary spool valve and a flow control rotary spool valve.

Referring to FIG. 5, in another exemplary embodiment, the oil flow control module 68 includes a flow control rotary spool valve 110 positioned downstream of the temperature control rotary spool valve 94. The flow control rotary spool valve 110 is adapted to selectively and independently control a flow of oil within the first oil flow circuit 62A, the second oil flow circuit 62B and the third oil flow circuit 62C. Thus, when the temperature flow rotary spool valve 94 routes the oil flow forward, the oil travels to the flow control rotary spool valve 110, as indicated by arrow 112. The flow control rotary spool valve 110 includes a spool 114 that has large diameter lands 116, machined to rotate within a close-fitting bore 118 of the oil flow control module 68. The lands 116 of the spool 114 divide the bore 118 into a series of separate chambers. The spool 114, depending on the rotational position within the bore 118, provides different oil flow paths by opening and closing of connected ports by the spool lands 116. The ports of the oil flow control module 68 lead into these chambers and the position of the spool 114 within the flow control rotary spool valve 110 determines the nature of oil flow into the first, second and third oil flow circuits 62A, 62B, 62C. Oil flow may be opened, closed or metered in any combination of one or more of the first, second and third oil flow circuits 62A, 62B, 62C depending on the dimensional characteristic of the spool 114.

Each of the temperature control rotary spool valve 94 and the flow control rotary spool valve 110 are positioned within a machined bore 106, 118 of a housing of the oil flow control module 68, sealed within the machined bore 106, 118 by a top plate 120 and actuated by an actuator (solenoid/motor 108). Referring to FIG. 7, the flow control rotary spool valve 110 is housed within a machined bore 118 of the housing of the oil flow control module 68 and includes a spool 114 with various lands 116 that define different flow paths for oil entering a center chamber 122 of the spool 114, as indicated by arrow 124, and to flow into one or more of the first, second and third oil flow circuits 62A, 62B, 62C. As shown in FIG. 7, the spool 114 within the flow control rotary spool valve 110 is rotationally positioned within the machined bore 118 of the oil flow control module 68 such that oil flow is open into the third oil flow circuit 62C and oil flow is closed off for the first and second oil flow circuits 62A, 62B.

Referring to FIG. 8, the temperature control rotary spool valve 94 is housed within a machined bore 106 of the housing of the oil flow control module 68 and includes a spool 104 with various lands 102 that define different flow paths for oil entering a center chamber 122 of the spool 104, either directly from the main sump 70, as indicated by arrow 126A, or after passing through the heat exchanger 92, as indicated by arrow 126B. Oil received from before the heat exchanger 92, as indicated by arrow 126A and oil received after passing through the heat exchanger 92, as indicated by arrow 126B are combined within the central chamber 122 of the temperature control rotary spool valve and routed to the flow control rotary valve 110, as indicated by arrow 128.

In an exemplary embodiment, the ports within the flow control rotary spool valve 110 that interconnect to the first, second and third oil flow circuits 62A, 62B, 62C are strategically ordered. An aspect of spool valves that must be accommodated for is leakage of oil between the lands and the machined bore. Often seals and o-rings are used to attempt to minimize such leakage. Leakage of oil into one of the plurality of oil flow circuits 62A, 62B, 62C may have serious negative consequences, while leakage of oil into another one of the plurality of oil flow circuits 62A, 62B, 62C may have little or no negative affect. Thus, the plurality of oil flow circuits 62A, 62B, 62C are strategically positioned along the length of the flow control rotary spool valve 110, wherein the one of the plurality of oil flow circuits 62A, 62B, 62C that is least affected by inadvertent leakage of oil flow around the lands 116 of the spool 114 of the flow control rotary valve 110 is positioned closest to the flow of incoming oil, as indicated by arrow 124, where the pressure of the oil is highest and leakage is most likely. The one of the plurality of oil flow circuits 62A, 62B, 62C that is most affected by inadvertent leakage of oil flow around the lands 116 of the spool 114 of the flow control rotary valve 110 is positioned furthest away from the flow of incoming oil, where the pressure of the oil is lower and leakage is less likely. As shown in FIG. 7, the first oil flow circuit 62A, which provides oil flow to the gear set 54, is positioned closest to the oil flow inlet, as leakage of oil into the first oil flow circuit 62A will have little or no affect on the operation of the electric drive unit 20. The third oil flow circuit 62C, which provides oil flow to the stator end turn spray baffles 64, is positioned furthest away from the oil flow inlet, as leakage into the third oil flow circuit 62C is undesirable.

Referring to FIG. 4 and FIG. 5, in an exemplary embodiment, the electric drive unit 20 further includes a temperature control bypass circuit 132 adapted to selectively allow oil flow from the oil delivery system 60 to bypass the temperature control rotary spool valve 94. As shown the temperature control bypass circuit 132 includes a spring loaded ball check valve 134, wherein if the pressure of oil upstream from the temperature control rotary spool valve 94 exceeds a pre-determined value, the pressure overcomes the spring bias of the ball check valve 134 and allows oil flow to pass directly to the first and second linear spool valves 74A, 74B, as indicated by arrow 136 in FIG. 4, or directly to the flow control rotary spool valve 110, as indicated by arrow 138 in FIG. 5. The temperature control bypass circuit 132 allows oil flow to bypass the temperature control rotary spool valve 94 when the temperature control rotary spool valve 94 is not needed. When the system is calling for the coldest possible oil (the heat exchanger can cool the oil no further), the temperature control rotary spool valve 94 is redundant and presents an un-necessary restriction in the flow of oil to the flow control rotary spool valve 110. As the spool 104 of the temperature control rotary spool valve 94 rotates and is allowing more cold oil (oil routed to the temperature control rotary spool valve 94 after passing through the heat exchanger 92) and less hot oil (oil routed to the temperature control rotary spool valve 94 without passing through the heat exchanger 92), the temperature control rotary spool valve 94 will eventually completely shut off the flow of oil there-through. As the temperature control rotary spool valve 94 continues to provide cooler and cooler oil, the passage allowing cooled oil that enters the temperature control rotary spool valve 94, as indicated by arrow 96 in FIG. 4 and arrow 126B in FIG. 8, is getting bigger and the passage allowing hot oil that enters the temperature control rotary spool valve 94, as indicated by arrow 100 in FIG. 4 and arrow 126A in FIG. 8, is getting smaller. Eventually the flow of hot oil directly from the main sump 70 will be zero, and continued rotation of the spool 104 within the temperature control rotary spool valve 94 will begin reducing the flow of cold oil (from the heat exchanger 92), and ultimately, the flow of cold oil will go to a minimum flow or possibly zero flow. Thus, in certain circumstances, when the system is calling for the coolest possible oil, the temperature control rotary spool valve 94 can end up restricting the flow of oil entirely, in which case, the pressure of the oil upstream from the temperature control rotary spool valve 94 will open the ball check valve 134 of the temperature control bypass circuit 132, allowing the oil to bypass the temperature control rotary spool valve 94. This reduces the pressure drop when the system is operating at the coldest oil temperatures and reduces the pump work at the coldest oil temperatures.

Figure 6:
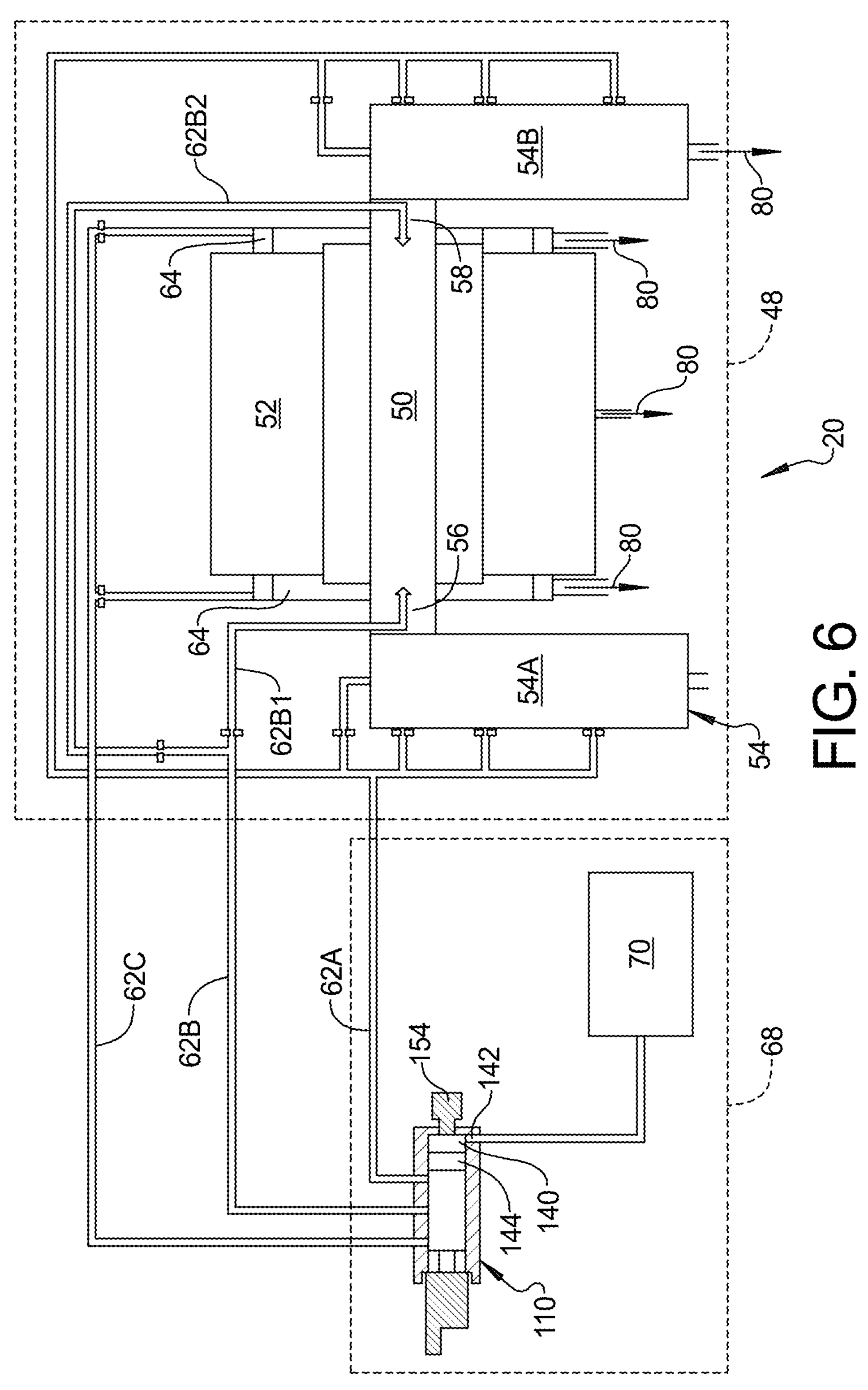
FIG. 6 is a schematic diagram of an electric drive unit according to an exemplary embodiment of the present disclosure wherein an oil flow control module includes a flow control rotary spool valve having a pump integrated therein.

Referring to FIG. 6, in another exemplary embodiment, the pump 72B is positioned within the machined bore 118 adjacent the flow control rotary spool valve 110. The pump 72B is adapted to pull oil from the main sump 70 and feed pressurized oil to the flow control rotary spool valve 110. Referring to FIG. 9, the pump 72B includes a gerotor 140 rotationally supported within the machined bore 118 within the oil flow control module 68, coaxial with the flow control rotary spool valve 110. The machined bore 118 is in communication with the main sump 70 at a point 142 adjacent to the gerotor 140. A port plate 144 is positioned within the machined bore 118 between and coaxial with the gerotor 140 and the flow control rotary spool valve 110. The port plate 144 includes a port 146 adapted to channel oil flow from the gerotor 140, at an outer periphery 148 of the machined bore 118, to the central oil passage 150 within the spool 114 of the flow control rotary spool valve 110. An anti-rotational key 152 is adapted to prevent rotational movement of the port plate 144 and allow axial float of the port plate 144 within the machined bore 118 of the oil flow control module 68, and a motor 154 is adapted to rotate the gerotor 140 within the machined bore 118. Rotation of the gerotor 140 pulls oil from the main sump 70 and pushes pressurized oil through the port plate 144 to the flow control rotary spool valve 110.

Referring to FIG. 2, FIG. 3, FIG. 4 and FIG. 5, in an exemplary embodiment, the oil flow control module 68 includes an integrated pressure side filter 156. Filtering the oil before the oil reaches linear spool valves 74A, 74B, 74C, rotary spool valves 94, 110 and components of the electric motor 48 of the electric drive unit 20 is important to reduce the amount of scuffing due to contaminants within the oil. Further, the oil flow control module 68 includes a filter bypass circuit 158 adapted to selectively allow oil flow to bypass the pressure side filter 156. As shown the filter bypass circuit 158 includes a spring loaded ball check valve 160, wherein if the pressure of oil upstream from the filter 156 exceeds a pre-determined value, the pressure overcomes the spring bias of the ball check valve 160 and allows oil flow to pass around the filter 156, as indicated by arrow 162.

Figure 10:
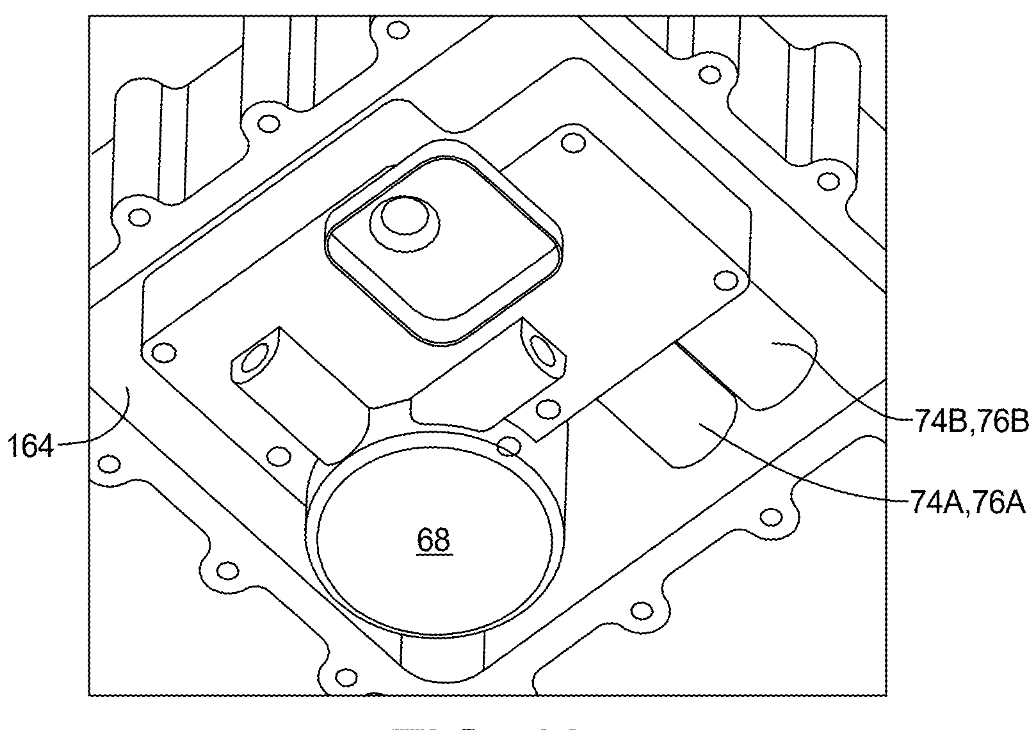
FIG. 10 is a perspective view of an oil flow control module mounted within an electric drive unit.
Figure 11:
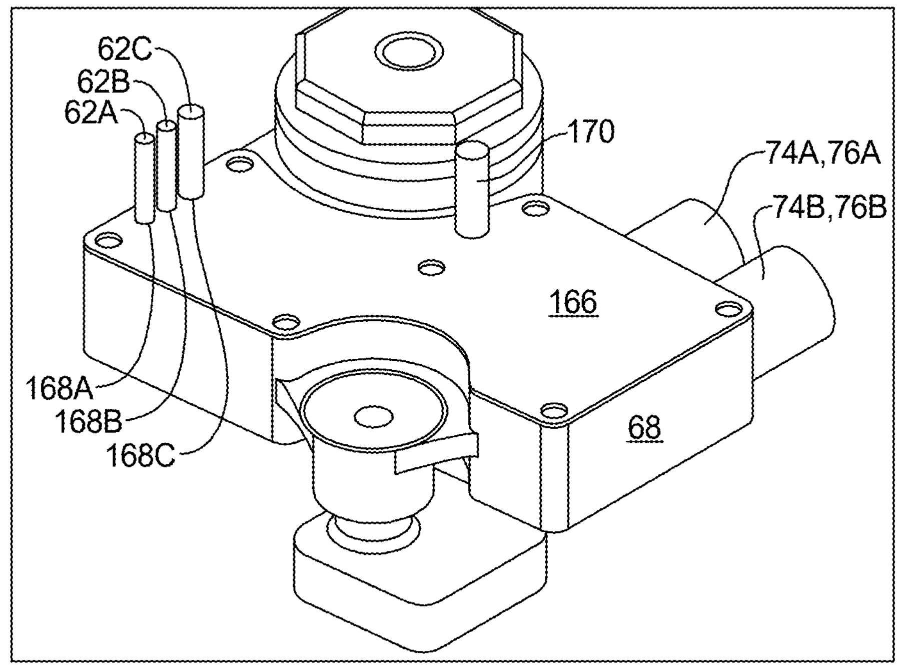
FIG. 11 is a perspective view of the oil flow module shown in FIG. 10 wherein the oil flow control module is removed from the electric drive unit.

Referring to FIG. 10, the oil flow control module 68 is a modular component that is mounted onto a housing 164 of the electric drive unit 20. The oil flow control module 68 may be removed and a different oil flow control module 68 providing different flow control characteristics may be installed within the electric drive unit 20. Referring to FIG. 11, a spacer plate 166 is placed onto a mating surface of the oil flow control module 68. The spacer plate includes first, second and third orifices 168A, 168B, 168C that align with the first, second and third oil flow circuits 62A, 62B, 62C, and an orifice 170 that aligns with the incoming flow of oil from the main sump 70. The spacer plate 166 is customized to the particular oil flow control module 68, and different oil flow control modules 68 can be installed within the housing 164 of the electric drive unit 20 by utilizing a spacer plate 166 specifically made for the oil flow control module 68.

In another exemplary embodiment, the oil flow control module 68 is machined integrally within the housing 164 of the electric drive unit 20. In this embodiment, the oil flow control module 68, including any corresponding machined bores, oil flow circuits, linear spool valves and/or rotary spool valves are formed integrally within the housing 164, improving packaging and assembly characteristics of the electric drive unit 20.

An electric drive unit of the present disclosure offers the advantage of allowing individual active control of multiple oil flow circuits. Further, the electric drive unit of the present disclosure provides a pump that is incorporated within a flow control rotary spool valve for controlling oil flow within a plurality of oil flow circuits, providing reduced cost, better packaging and better overall performance of the electric drive unit, including, but not limited to higher mechanical and electro-mechanical efficiencies and reduction of losses, including spinloss, magnetic flux and core losses and parasitic losses.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An electric drive unit comprising:

an electric motor including a rotor and a stator, the rotor operationally connected to a gear set;

an oil delivery system adapted to supply pressurized oil to a plurality of discreet oil flow circuits within the electric motor; and an oil flow control module positioned between the electric motor and the oil delivery system and adapted to provide independent active control of oil flow within at least two of the plurality of oil flow circuits within the electric motor;

the plurality of oil flow circuits including a first oil flow circuit, a second oil flow circuit, and a third oil flow circuit, and the oil flow control module including a flow control rotary spool valve positioned within a machined bore of a housing of the oil flow control module, sealed within the machined bore by a top plate and actuated by an actuator to selectively and independently control a flow of oil within the first oil flow circuit, the second oil flow circuit and the third oil flow circuit, wherein a pump is positioned within the machined bore adjacent the flow control rotary spool valve and adapted to pull oil from a main sump and feed pressurized oil to the flow control rotary spool valve.

2. The electric drive unit of claim 1, wherein the oil flow control module includes a plurality of linear spool valves, one of the plurality of linear spool valves associated with each one of the at least two of the plurality of oil flow circuits being controlled by the oil flow control module and adapted to provide independent active control of oil flow within the associated oil flow circuit.

3. The electric drive unit of claim 2, wherein the oil flow control module includes a plurality of linear force solenoids, one of the plurality of linear force solenoids associated with each one of the plurality of linear spool valves and adapted to selectively actuate the associated spool valve.

4. The electric drive unit of claim 3, wherein the plurality of linear spool valves of the oil flow control module including a first linear spool valve and the plurality of linear force solenoids of the oil flow control module including a first linear force solenoid, the first linear force solenoid adapted to selectively actuate the first linear spool valve and the first linear spool valve adapted to selectively control a flow of oil within the first oil flow circuit and actively control oil flow to the gear set of the electric motor; and the plurality of linear spool valves of the oil flow control module further including a second linear spool valve and the plurality of linear force solenoids of the oil flow control module further including a second linear force solenoid, the second linear force solenoid adapted to selectively actuate the second linear spool valve and the second linear spool valve adapted to selectively control a flow of oil within the second oil flow circuit and actively control oil flow to the rotor of the electric motor.

5. The electric drive unit of claim 4, wherein the electric motor includes a fifth oil flow circuit adapted to provide oil flow to an air gap between the stator and the rotor within the electric motor;

the plurality of linear spool valves of the oil flow control module further including a third linear spool valve and the plurality of linear force solenoids of the oil flow control module further including a third linear force solenoid, the third linear force solenoid adapted to selectively actuate the third linear spool valve and the third linear spool valve adapted to selectively control a flow of oil within the fifth oil flow circuit and actively control oil flow to the air gap between the stator and the rotor within the electric motor.

6. The electric drive unit of claim 4, wherein the gear set of the electric motor comprises a first gear set operationally engaged with a first end of the rotor and a second gear set operationally engaged with a second end of the rotor; and wherein, the first oil flow circuit is adapted to provide oil flow to each of the first and second gear sets, and the second oil flow circuit includes a first spur adapted to provide oil flow for magnet cooling and a second spur adapted to provide oil flow for differential lubrication.

7. The electric drive unit of claim 4, wherein the oil delivery system includes a main sump, an oil pump adapted to pull oil from the main sump and supply pressurized oil to the oil flow control module, and a heat exchanger positioned between the oil pump and the oil flow control module;

the oil flow control module including a temperature control rotary spool valve adapted to selectively:

route oil flow from the oil delivery system to the at least two of the plurality of oil flow circuits within the electric motor that are controlled by the oil flow module prior to the oil passing through the heat exchanger; and route oil flow from the oil delivery system to the at least two of the plurality of oil flow circuits within the electric motor that are controlled by the oil flow module after the oil passes through the heat exchanger;

the temperature control rotary spool valve adapted to meter the ratio of oil that does not pass through the heat exchanger to the oil that passes through the heat exchanger to control a temperature of the oil routed to the at least two of the plurality of oil flow circuits within the electric motor that are controlled by the oil flow module.

8. The electric drive unit of claim 1, wherein the first oil flow circuit is adapted to provide oil flow to the gear set of the electric motor, the second oil flow circuit is adapted to provide oil flow to the rotor of the electric motor, and the third oil flow circuit is adapted to provide oil flow to end turn spray baffles of the electric motor.

9. The electric drive unit of claim 8, wherein the oil delivery system includes a main sump, an oil pump adapted to pull oil from the main sump and supply pressurized oil to the oil flow control module, and a heat exchanger positioned between the oil pump and the oil flow control module;

the oil flow control module including a temperature control rotary spool valve adapted to selectively:

route oil flow from the oil delivery system to the at least two of the plurality of oil flow circuits within the electric motor that are controlled by the oil flow module prior to the oil passing through the heat exchanger; and route oil flow from the oil delivery system to the at least two of the plurality of oil flow circuits within the electric motor that are controlled by the oil flow module after the oil passes through the heat exchanger;

the temperature control rotary spool valve adapted to meter the ratio of oil that does not pass through the heat exchanger to the oil that passes through the heat exchanger to control a temperature of the oil routed to the at least two of the plurality of oil flow circuits within the electric motor that are controlled by the oil flow module.

10. The electric drive unit of claim 9, further including a temperature control bypass circuit adapted to selectively allow oil flow from the oil delivery system to bypass the temperature control rotary spool valve;

wherein, when the temperature control rotary spool valve is selectively actuated to allow only oil that has passed through the heat exchanger to flow through the temperature control rotary spool valve, the temperature control bypass circuit is adapted to allow oil that has passed through the heat exchanger to bypass the temperature control rotary spool valve.

11. The electric drive unit of claim 9, wherein each of the temperature control rotary spool valve and the flow control rotary spool valve are positioned within a machined bore of a housing of the oil flow control module, sealed within the machined bore by a top plate and actuated by an actuator.

12. The electric drive unit of claim 8, wherein the pump comprises:

a gerotor rotationally supported within the machined bore within the oil flow control module, coaxial with the flow control rotary spool valve, the machined bore in communication with the main sump at a point adjacent to the gerotor;

a port plate positioned within the machined bore between and coaxial with the gerotor and the flow control rotary spool valve, the port plate including a port adapted to channel oil flow from the gerotor at an outer periphery of the machined bore to a central oil passage within the flow control rotary spool valve;

a motor adapted to rotate the gerotor within the machined bore;

wherein, rotation of the gerotor pulls oil from the main sump and pushes pressurized oil through the port plate to the flow control rotary spool valve.

13. The electric drive unit of claim 1, wherein the oil flow control module includes an integrated pressure side filter.

14. The electric drive unit of claim 8, wherein the oil flow control module includes a filter bypass circuit adapted to selectively allow oil flow to bypass the pressure side filter.

15. The electric drive unit of claim 1, wherein the oil flow control module is one of:

a modular component that is mounted onto a housing of the electric drive unit, wherein the oil flow control module may be removed and a different oil flow control module providing different flow control characteristics may be installed within the electric drive unit; and machined integrally within a housing of the electric drive unit.

16. An electric drive unit comprising:

a electric motor including a rotor, a stator, a first gear set operationally engaged with a first end of the rotor and a second gear set operationally engaged with a second end of the rotor;

a first oil flow circuit adapted to provide oil flow to the first gear set and the second gear set of the electric motor;

a second oil flow circuit adapted to provide oil flow to the rotor of the electric motor;

a third oil flow circuit adapted to provide oil flow to end turn spray baffles of the electric motor;

a fourth oil flow circuit adapted to provide oil flow to the stator of the electric motor;

a fifth oil flow circuit adapted to provide oil flow to an air gap between the stator and the rotor within the electric motor;

an oil delivery system adapted to supply pressurized oil to the first, second, third, fourth and fifth oil flow circuits, the oil delivery system including a main sump and a heat exchanger positioned between the main sump and the oil flow control module; and an oil flow control module positioned between the electric motor and the oil delivery system and adapted to provide independent active control of oil flow within the first, second, third, fourth and fifth oil flow circuits within the electric motor the oil flow control module including:

a temperature control rotary spool valve adapted to selectively:

route oil flow from the oil delivery system to the at least two of the plurality of oil flow circuits within the electric motor that are controlled by the oil flow module prior to the oil passing through the heat exchanger; and route oil flow from the oil delivery system to the at least two of the plurality of oil flow circuits within the electric motor that are controlled by the oil flow module after the oil passes through the heat exchanger;

the temperature control rotary spool valve adapted to meter the ratio of oil that does not pass through the heat exchanger to the oil that passes through the heat exchanger to control a temperature of the oil routed to the at least two of the plurality of oil flow circuits within the electric motor that are controlled by the oil flow module;

a temperature control bypass circuit adapted to selectively allow oil flow from the oil delivery system to bypass the temperature control rotary spool valve;

an integrated pressure side filter; and a filter bypass circuit adapted to selectively allow oil flow to bypass the integrated pressure side filter.

17. The electric drive unit of claim 16, wherein the oil flow control module further includes:

a first linear spool valve and a first linear force solenoid, the first linear force solenoid adapted to selectively actuate the first linear spool valve and the first linear spool valve adapted to selectively control a flow of oil within the first oil flow circuit and actively control oil flow to the first and second gear sets of the electric motor;

a second linear spool valve and a second linear force solenoid, the second linear force solenoid adapted to selectively actuate the second linear spool valve and the second linear spool valve adapted to selectively control a flow of oil within the second oil flow circuit and actively control oil flow to the rotor of the electric motor; and a third linear spool valve and a third linear force solenoid, the third linear force solenoid adapted to selectively actuate the third linear spool valve and the third linear spool valve adapted to selectively control a flow of oil within the fifth oil flow circuit and actively control oil flow to the air gap between the stator and the rotor within the electric motor.

18. The electric drive unit of claim 16, wherein the oil flow control module includes a flow control rotary spool valve adapted to selectively and independently control a flow of oil within the first oil flow circuit, the second oil flow circuit and the third oil flow circuit;

wherein the flow control rotary spool valve is positioned within a machined bore of a housing of the oil flow control module, sealed within the machined bore by a top plate and actuated by an actuator; and further wherein, a pump is positioned within the machined bore adjacent the flow control rotary spool valve, the pump adapted to pull oil from the main sump and feed pressurized oil to the flow control rotary spool valve, the pump including:

a gerotor rotationally supported within the machined bore within the oil flow control module, coaxial with the flow control rotary spool valve, the machined bore in communication with the main sump at a point adjacent to the gerotor;

a port plate positioned within the machined bore between and coaxial with the gerotor and the flow control rotary spool valve, the port plate including a port adapted to channel oil flow from the gerotor at an outer periphery of the machined bore to a central oil passage within the flow control rotary spool valve;

an anti-rotational key adapted to prevent rotational movement of the port plate and allow axial float of the port plate within the machined bore of the oil flow control module; and a motor adapted to rotate the gerotor within the machined bore;

wherein, rotation of the gerotor pulls oil from the main sump and pushes pressurized oil through the port plate to the flow control rotary spool valve.

19. A vehicle having an electric drive unit, the electric drive unit comprising:

a electric motor including a rotor, a stator, a first gear set operationally engaged with a first end of the rotor and a second gear set operationally engaged with a second end of the rotor;

a first oil flow circuit adapted to provide oil flow to the first gear set and the second gear set of the electric motor;

a second oil flow circuit adapted to provide oil flow to the rotor of the electric motor;

a third oil flow circuit adapted to provide oil flow to end turn spray baffles of the electric motor;

a fourth oil flow circuit adapted to provide oil flow to the stator of the electric motor;

a fifth oil flow circuit adapted to provide oil flow to an air gap between the stator and the rotor within the electric motor;

an oil delivery system adapted to supply pressurized oil to the first, second, third, fourth and fifth oil flow circuits, the oil delivery system including a main sump and a heat exchanger positioned between the main sump and the oil flow control module; and an oil flow control module positioned between the electric motor and the oil delivery system and adapted to provide independent active control of oil flow within the first, second, third, fourth and fifth oil flow circuits within the electric motor the oil flow control module including:

a temperature control rotary spool valve adapted to selectively:

route oil flow from the oil delivery system to the at least two of the plurality of oil flow circuits within the electric motor that are controlled by the oil flow module prior to the oil passing through the heat exchanger; and route oil flow from the oil delivery system to the at least two of the plurality of oil flow circuits within the electric motor that are controlled by the oil flow module after the oil passes through the heat exchanger;

the temperature control rotary spool valve adapted to meter the ratio of oil that does not pass through the heat exchanger to the oil that passes through the heat exchanger to control a temperature of the oil routed to the at least two of the plurality of oil flow circuits within the electric motor that are controlled by the oil flow module;

a temperature control bypass circuit adapted to selectively allow oil flow from the oil delivery system to bypass the temperature control rotary spool valve;

an integrated pressure side filter:

a filter bypass circuit adapted to selectively allow oil flow to bypass the integrated pressure side filter; and one of:

a first linear spool valve and a first linear force solenoid, the first linear force solenoid adapted to selectively actuate the first linear spool valve and the first linear spool valve adapted to selectively control a flow of oil within the first oil flow circuit and actively control oil flow to the first and second gear sets of the electric motor, a second linear spool valve and a second linear force solenoid, the second linear force solenoid adapted to selectively actuate the second linear spool valve and the second linear spool valve adapted to selectively control a flow of oil within the second oil flow circuit and actively control oil flow to the rotor of the electric motor, and a third linear spool valve and a third linear force solenoid, the third linear force solenoid adapted to selectively actuate the third linear spool valve and the third linear spool valve adapted to selectively control a flow of oil within the fifth oil flow circuit and actively control oil flow to the air gap between the stator and the rotor within the electric motor; or a flow control rotary spool valve adapted to selectively and independently control a flow of oil within the first oil flow circuit, the second oil flow circuit and the third oil flow circuit, the flow control rotary spool valve positioned within a machined bore of a housing of the oil flow control module, sealed within the machined bore by a top plate and actuated by an actuator, and a pump positioned within the machined bore adjacent the flow control rotary spool valve, the pump adapted to pull oil from the main sump and feed pressurized oil to the flow control rotary spool valve, the pump including:

a gerotor rotationally supported within the machined bore within the oil flow control module, coaxial with the flow control rotary spool valve, the machined bore in communication with the main sump at a point adjacent to the gerotor, a port plate positioned within the machined bore between and coaxial with the gerotor and the flow control rotary spool valve, the port plate including a port adapted to channel oil flow from the gerotor at an outer periphery of the machined bore to a central oil passage within the flow control rotary spool valve, an anti-rotational key adapted to prevent rotational movement of the port plate and allow axial float of the port plate within the machined bore of the oil flow control module, and a motor adapted to rotate the gerotor within the machined bore;

wherein, rotation of the gerotor pulls oil from the main sump and pushes pressurized oil through the port plate to the flow control rotary spool valve.

20. The electric drive unit of claim 12, wherein the pump further comprises an anti-rotational key adapted to prevent rotational movement of the port plate and allow axial float of the port plate within the machined bore of the oil flow control module.

* * * * *